United States Patent [19]

Röhm

[11] Patent Number: 4,583,751

[45] Date of Patent: Apr. 22, 1986

[54] LOCKING DRILL CHUCK WITH PROTECTION AGAINST OVERTIGHTENING

[76] Inventor: Günter H. Röhm, Heinrich-Röhm-Str. 50, 7927 Sontheim, Fed. Rep. of Germany

[21] Appl. No.: 702,053

[22] Filed: Feb. 15, 1985

[30] Foreign Application Priority Data

Feb. 16, 1984 [DE] Fed. Rep. of Germany ....... 3405511

[51] Int. Cl.$^4$ .................. B23B 31/12; G05G 5/18
[52] U.S. Cl. ........................ 279/1 K; 74/578; 279/60; 279/62; 408/241 R
[58] Field of Search ............. 279/1 K, 1 ME, 19, 19.3, 279/19.4, 19.5, 60–65, 1 R; 81/60, 63.1, 63.2, 467, 473, 474; 74/575, 578; 408/241 R

[56] References Cited

U.S. PATENT DOCUMENTS

| | | | |
|---|---|---|---|
| 1,148,649 | 8/1915 | Bayles | 173/139 X |
| 1,565,473 | 12/1925 | Lee | 74/578 X |
| 4,058,192 | 11/1977 | Haigh | 74/578 X |
| 4,302,021 | 11/1981 | Röhm | 279/60 |

FOREIGN PATENT DOCUMENTS 2847927 5/1980 Fed. Rep. of Germany .
2034210 6/1980 United Kingdom .................. 279/60

Primary Examiner—Z. R. Bilinsky
Assistant Examiner—Steven C. Bishop
Attorney, Agent, or Firm—Karl F. Ross; Herbert Dubno

[57] ABSTRACT

A drill chuck has a body carrying jaws displaceable between inner and outer positions and an adjustment ring operatively connected to the jaws for movement from outer to inner positions on rotation of the adjustment ring in a tightening direction. This adjustment ring has teeth engageable by an antiloosening detent and is urged by a spring into the teeth. The antiloosening detent is angled relative to the adjustment ring such that when engaging the teeth it blocks rotation of the adjustment ring opposite to the tightening direction and permits rotation of the adjustment ring in the tightening direction. An antitightening detent engageable with the teeth of the adjustment ring is urged by a spring outward into the teeth and is angled relative to the adjustment ring such that when engaging the teeth it blocks rotation of the adjustment ring in the tightening direction and permitting rotation of the adjustment ring opposite to the tightening direction. A lockout element engageable with both of the detents can move between a holdback position holding the detents out of engagement with the adjustment ring and a freeing position permitting the detents to engage with and lock in the respective directions on the adjustment ring. A guide surrounds the antitightening detent and has a stop against which the antitightening detent is urged by a side spring so that when the antitightening detent is engaged with the teeth it can move in the tightening direction with the adjustment ring only until it engages its stop.

7 Claims, 4 Drawing Figures

LOCKING DRILL CHUCK WITH PROTECTION AGAINST OVERTIGHTENING

FIELD OF THE INVENTION

The present invention relates to a chuck. More particularly this invention concerns a chuck for use in a hammer drill or the like.

BACKGROUND OF THE INVENTION

As described in my German patent No. 2,847,927, a chuck has a chuck body centered on an axis, carried on a spindle of a hammer drill, and formed with several angularly equispaced guide passages extending at an acute angle to the chuck axis and receiving respective axially slidable jaws. An adjustment sleeve carried on the chuck body centered on the chuck axis and rotatable thereabout on this body is fixed to a ratchet ring having an inner surface formed with a screwthread that meshes with outwardly directed complementary teeth on the jaws. Thus rotation of the sleeve in a tightening direction moves the jaws along their guides from a back position in which they are radially relatively far apart to a front position in which they are relatively closely spaced and opposite rotation moves the jaws further apart.

In order to prevent such a chuck from loosening, the chuck body is formed with a guide passage that slidably receives a detent pin movable secantally relative to the chuck axis and urged outward by a spring so that its outer tip engages between radially inwardly directed teeth formed in this adjustment sleeve. A lockout ring can be turned on the chuck body about the chuck axis and has a lower edge just projecting to level with this detent. This ring has an inner surface engaging radially inward against the detent and formed with a pocket so that this ring can be rotated between an adjustment or holdback position in which its surface bears against the detent and holds the detent tip clear of the teeth and a ratcheting position in which the pocket is aligned with the detent so its spring can urge it outward along its secantal axis to engage its tip between the teeth.

Thus when the lockout ring is in the ratcheting position, rotation of the ratchet ring in the tightening direction will engage the forwardly directed flanks of the teeth against the tip of the detent and will push it along its axis back into the chuck body, allowing such rotation of the ratchet ring in the tightening direction. Opposite rotation will be impeded as the rear flanks will engage flatly against the rear side of the tip, in a direction perpendicular to the detent axis and to the force of its spring, so that the detent pin will merely be wedged sideways in its guide passage. Thus when aligned with the respective pocket of the lockout ring this detent pin allows the chuck to be tightened but prevents it from loosening.

Such an arrangement does indeed effectively prevent the chuck from loosening once it has been tightened on a tool or workpiece. In addition it allows overtightening after the workpiece or tool has been fitted, to compensate for any loosening that might occur.

The principal disadvantage of such a system is that it allows the chuck to be tightened enough to damage the tool or workpiece. When used in a hammer drill this arrangement allows the user to tighten down the chuck enough to cause the jaws to bite into the tool, whereas the chuck need only be tight enough to provide good transmission of torque, while permitting some relative axial displacement between the jaws and the bit.

OBJECTS OF THE INVENTION

It is therefore an object of the present invention to provide an improved drill chuck.

Another object is the provision of such a drill chuck which overcomes the above-given disadvantages, that is which cannot be accidentally overtightened.

SUMMARY OF THE INVENTION

A drill chuck according to the invention has a chuck body centered on and rotatable about an axis and formed with a plurality of guides spaced about and extending at an acute angle to the axis. Respective jaws are displaceable along the guides between axial front positions relatively close together and axial back positions spaced relatively far apart. An adjustment ring carried on the body is operatively connected to the jaws for movement from the outer to the inner positions on rotation of the adjustment ring about the axis in a tightening direction on the chuck body. This adjustment ring is formed with an array of inwardly directed ratchet teeth engageable generally radially by an antiloosening detent and is urged by a spring outward into engagement with the teeth. The antiloosening detent is angled relative to the adjustment ring such that when engaging between the teeth of the adjustment ring it substantially blocks rotation of the adjustment ring on the body opposite to the tightening direction while ratcheting and permitting rotation of the adjustment ring on the body in the tightening direction. An antitightening detent engageable generally radially outwardly with the teeth of the adjustment ring is urged by a spring outward into engagement with the teeth. The antitightening detent is angled relative to the adjustment ring such that when engaging between the teeth of the adjustment ring it generally blocks rotation of the adjustment ring on the body in the tightening direction while ratcheting and permitting rotation of the adjustment ring on the body opposite to the tightening direction. A lockout element engageable with both of the detents is displaceable between a holdback position holding the detents out of engagement with the adjustment ring and a freeing position permitting the detents to engage with and lock in the respective directions on the adjustment ring. A guide surrounding the antitightening detent defines at least one stop therefor. The antitightening detent is urged angularly in the respective guide by a side spring so that when the antitightening detent is engaged with the teeth it can move in the tightening direction with the adjustment ring only until it engages its stop.

Thus with the system of this invention the chuck can be tightened and then locked. When thus locked it can still be tightened somewhat, but not a great deal, so that damage to the tool or workpiece is avoided. The extent of after-adjustability is set by the chuck manufacturer. In the case of a hammer drill, for instance, it is set so that the bits will not be ruined.

According to another feature of this invention the detents are pins centered on and slidable along respective axes extending secantally of the adjustment ring and the side spring is engaged generally perpendicular to the axis of the antitightening detent thereagainst. More particularly, the guide for the antitightening detent is a slot that is secantally flared, that lies generally in a plane perpendicular to the chuck axis, and that has an edge directed opposite to the tightening direction that constitutes the stop and an opposite edge against which the side spring urges the respective detent.

In addition according to the invention the detents have tips complementarily fitting between the teeth of the adjustment ring. These teeth have relative to the tightening direction front and back flanks with the front flank engaging the antiloosening detent substantially parallel to the respective axis and the rear flank engaging the antitightening detent substantially parallel to the axis thereof.

The lockout element itself is normally a ring axially offset from the adjustment ring. This ring is formed with a pair of pockets in which the respective detents are engageable in the freeing positions of the lockout ring.

DESCRIPTION OF THE DRAWING

The above and other features and advantages will become more readily apparent from the following, reference being made to the accompanying drawing in which.

SPECIFIC DESCRIPTION

Figure 1:
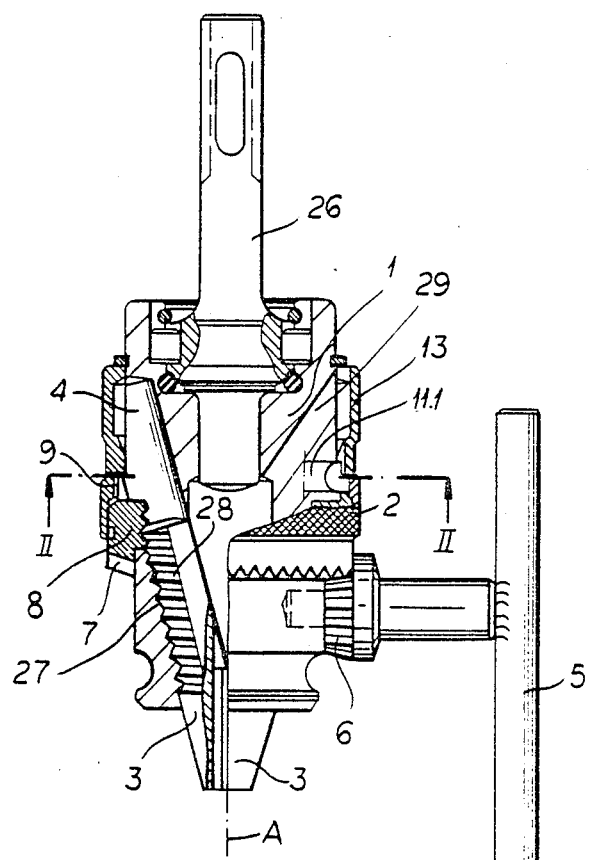
FIG. 1 is an axial section through a drill chuck according to this invention.
Figure 2:
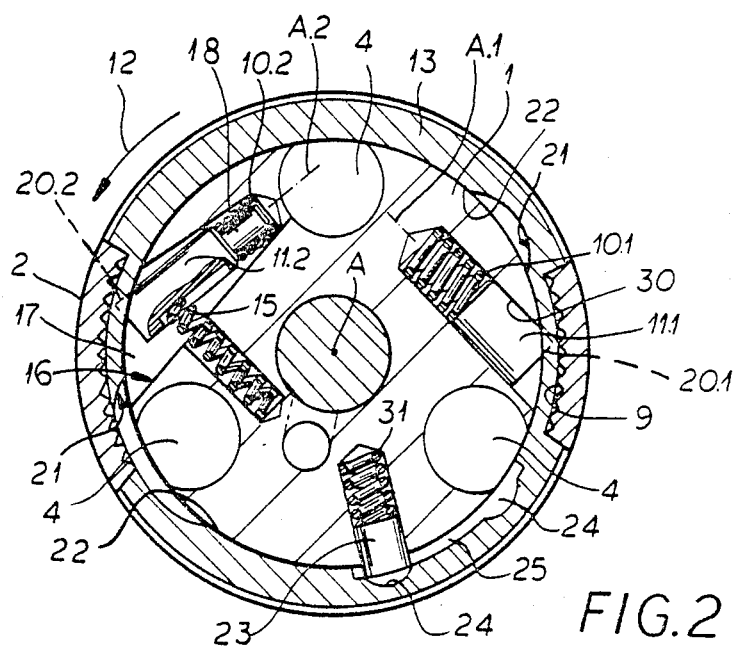
FIG. 2 is a cross section taken along line II—II of FIG. 1 and showing the chuck in the adjustment position.

As seen in FIGS. 1 and 2 the drill chuck according to this invention has a chuck body 1 centered on an axis A and carried on a spindle 26 of a hammer drill. The body 1 is formed with three angularly equispaced guide passages 4 extending at an acute angle to the axis A and receiving respective axially slidable jaws 3. The spindle 26 is rotationally coupled to but limitedly axially displaceable in the body 1 so its axial front end, the lower end in FIG. 1, can strike against the rear end of a unillustrated drill bit engaged between the jaws 3. A backwardly open passage 29 allows the body 1 to shed chips when the chuck is used for overhead drilling.

A milled adjustment sleeve 2 carried on the body 1 is centered on the axis A and rotatable thereabout on the body 1. It is fixed to a ring 8 having an inner surface formed with teeth or a screwthread 27 that meshes with outwardly directed complementary teeth 28 of the jaws 3. Thus, as is standard, rotation of the sleeve 2 in the tightening direction indicated by arrow 12 in FIG. 2 moves the jaws 3 along their guides from a back position in which they are relatively far apart to a front position in which they are relatively closely spaced or even engage each other. Opposite rotation moves the jaws further apart. For such rotation the ring 8 is formed with axially forwardly directed teeth 7 that can mesh with a pinion 6 of a typical chuck key 5 so that this ring 2 can be rotated with quite some angular force.

As is known from the above-described patent document, a detent pin 11.1 is slidable in a guide passage 30 in the body 1 along an axis A.1 extending secantally relative to the axis A and sleeve 2 and is urged outward by a respective spring 10.1 so that its its outer edge or tip 20.1 engages between radially inwardly directed teeth 9 formed in this sleeve 2.

A lockout ring 13 that can be turned on the body 1 about the axis A has a lower edge just projecting to a level with this antiloosening detent 11.1 and having an inner surface 22 engaging radially inward against the detent 11.1 and formed with a pocket 21. This ring 13 can be rotated between the adjustment position of FIG. 2 in which the surface 22 bears against the antiloosening detent 11.1 and holds the tip 20.1 clear of the teeth 9 and the ratcheting position of FIGS. 3 and 4 in which the pocket 21 is aligned with the detent 11.1 so its spring 10.1 can urge it outward along the secantal axis A.1 to engage the tip 20.1 between the teeth 9.

The body 1 also carries a holding pin 23 urged radially outward by a spring 31 and having a rounded outer end engageable in complementary radially inwardly open recesses 24 formed in the sleeve 13 at opposite ends of an angularly extending and radially inwardly open groove 25. When the sleeve 13 is in the position of FIG. 2 the pin 23 is engaged in the one recess 24 and when in the position of FIGS. 3 and 4 in the other. This holding pin 23 therefore defines stable positions for the sleeve 13 on the body 1 so that vibration during use will not maladjust the chuck, and also axially couples together the body 1 and sleeve 13.

Figure 3:
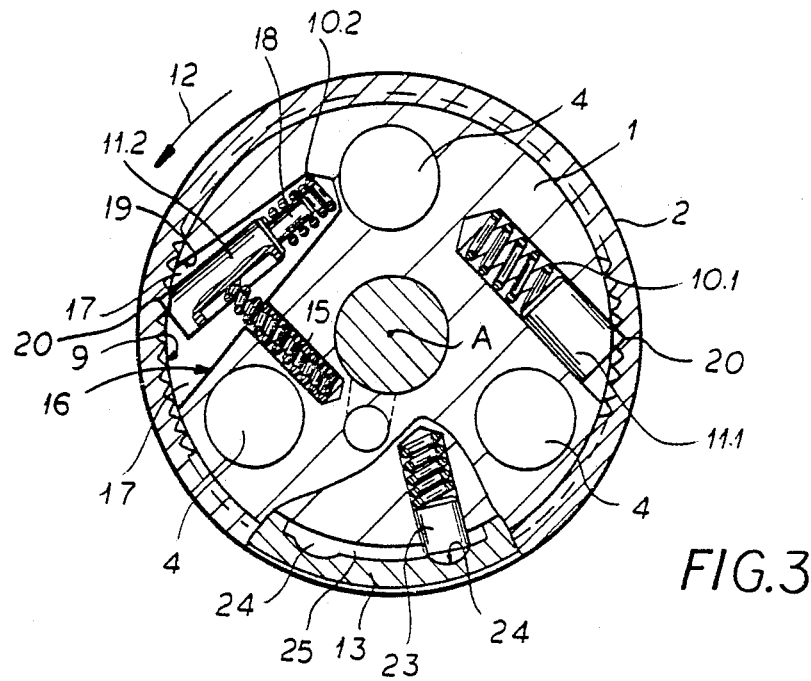
FIGS. 3 and 4 are sections similar to FIG. 2 and showing the chuck in the locked position, respectively before and after a tightening operation.
Figure 4:
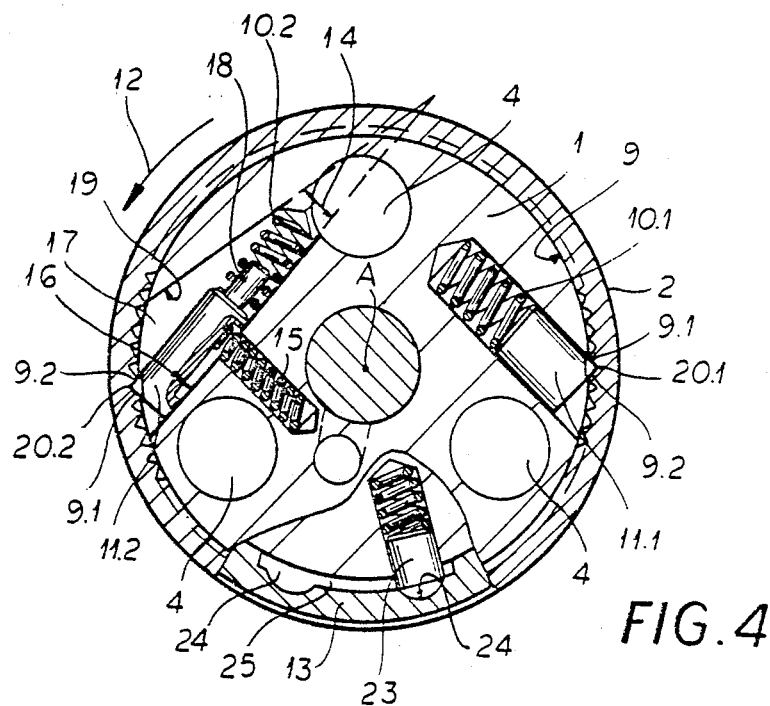

Thus when the lockout ring 13 is in the position of FIG. 3 or 4, rotation of the ring 2 in the tightening direction 12 will engage the forwardly directed flanks 9.2 of the teeth 9 against the end of the antiloosening detent 11.1 and will push it along its axis A.1 back into the body 1, allowing such rotation of the ring 2 in the tightening direction 12. Opposite rotation will be impeded as the rear flanks 9.1 will engage flatly against the rear side of the tip 20.1, in a direction perpendicular to the axis A.1 and to the force of the spring 10.1, so that the pin 11.1 will merely be wedged sideways in its guide passage 30. Thus when aligned with the respective pocket 21 this detent pin 11.1 allows the chuck to be tightened but prevents it from loosening.

According to the invention another similar detent pin 11.2 centered on a secantal axis A.2 is urged outward by a spring 10.2 This pin 11.2 is received in a guide slot 17 that has front and rear flanks 16 and 19 that extend at an angle 14 of around 15° to each other. The pin 11.2 itself is mainly cylindrical, like the pin 11.1, and is urged angularly against the rear flank 19 of the guide 17 by a compression spring 15. This virtual pivoting action of the pin 11.2 is made possible by providing the pin 11.2 with a small-diameter extension 18 that fits into the compression spring 10.2. The ring 13 is formed with a second pocket 21 that is aligned with the pin 11.2 when the first-mentioned pocket 21 is aligned with the pin 11.1 to permit the tip 20.2 of this pin 11.2 to engage between the teeth 9 of the ring 2.

The guide 17 opens opposite relative to the direction 12 to the guide 30. Thus the ratcheting action of the pin 11.2 is opposite to that of the pin 11.1, that is the pin 11.1 when in the operative position of FIGS. 3 and 4 will permit rotation in the loosening direction. Rotation in the tightening direction is only inhibited by the pin 11.2 after it has pivoted moved angularly from the flank 19 to the flank 16.

The chuck described above is operated as follows:

To start with the ring 13 is rotated in the direction 12 to its end position to put the pins 11.1 and 11.2 in the holdback position The ring 8 can therefore be rotated freely in either direction, but is normally rotated opposite to the direction 12 to spread the jaws 3 The shank of the bit is then inserted into the front of the chuck body between the jaws 3 and the sleeves 2 and 8 are rotated in the direction 8 by means of the key 5 until the jaws 3 tightly engage the bit.

The ring 13 is then rotated against the direction 12 to release the pins 11.1 and 11.2. The pin 11.1 will slide along its axis A.1 so its tip 20.1 will engage between the teeth 9 to prevent the ring 8 from rotating at all in the loosening direction opposite to the direction 12. The pin 11.2, which meanwhile will be pressed by its spring 15 against the back flank 19 will similarly slide forward and lodge its tip 20.2 between the teeth 9, but in a direction opposite to the pin 11.1.

If the chuck needs subsequent tightening, the user need merely insert the key 5 and turn. The pin 11.1 will not prevent such tightening, and the pin 11.2 will only impede it when the ring 2 has been rotated sufficiently to move the pin 11.2 from the flank 19 to the flank 16, where it will stop and arrest the ring 2 against further rotation in the tightening direction 12. Thus the system of this invention permits limited tightening of the chuck after it has been locked onto a workpiece or drill bit, but only limited tightening unless of course the ring 13 is operated. This limited tightening action therefore allows the chuck to be made a little tighter, but prevents it from biting into or crushing the piece being held.

I claim:

1. A drill chuck comprising:
   a chuck body centered on and rotatable about an axis and formed with a plurality of guides spaced about and extending at an acute angle to the axis;
   respective jaws displaceable along the guides between axial front positions relatively close together and axial back positions spaced relatively far apart;
   an adjustment ring carried on the body and operatively connected to the jaws for movement from the outer to the inner positions on rotation of the adjustment ring about the axis in a tightening direction on the chuck body, the adjustment ring being formed with an array of inwardly directed ratchet teeth;
   an antiloosening detent engageable generally radially outwardly with the teeth of the adjustment ring;
   a spring braced between the antiloosening detent and the body and urging the antiloosening detent outward into engagement with the teeth, the antiloosening detent being angled relative to the adjustment ring such that when engaging between the teeth of the adjustment ring, the antiloosening detent substantially blocks rotation of the adjustment ring on the body opposite to the tightening direction while ratcheting and permitting rotation of the adjustment ring on the body in the tightening direction;
   an antitightening detent engageable generally radially outwardly with the teeth of the adjustment ring;
   a spring braced between the antitightening detent and the body and urging the antitightening detent outward into engagement with the teeth, the antitightening detent being angled relative to the adjustment ring such that when engaging between the teeth of the adjustment ring, the antitightening detent generally blocks rotation of the adjustment ring on the body in the tightening direction while ratcheting and permitting rotation of the adjustment ring on the body opposite to the tightening direction;
   a lockout element engageable with both of the detents and displaceable between a holdback position holding the detents out of engagement with the adjustment ring and a freeing position permitting the detents to engage with and block rotation of the adjustment ring;
   a guide surrounding the antitightening detent and defining at least one stop therefor, the antitightening detent being displaceable angularly in the guide; and
   a side spring urging the antitightening detent angularly opposite to the tightening direction in the guide away from the stop, whereby when the antitightening detent is engaged with the teeth it can move in the tightening direction with the adjustment ring only until it engages the stop.

2. The chuck defined in claim 1 wherein each of the detents is a pin centered on and slidable along a respective axis extending secantally of the adjustment ring, the side spring being engaged against the antitightening detent generally perpendicular to the axis of the antitightening detent.

3. The chuck defined in claim 2 wherein the guide for the antitightening detent is a slot that is secantally flared, that lies generally in a plane perpendicular to the chuck axis, and that has an edge directed opposite to the tightening direction that constitutes the stop and an opposite edge against which the side spring urges the antitightening detent.

4. The chuck defined in claim 2 wherein each of the detents has a tip complementarily engaging between the teeth of the adjustment ring, each of the teeth having, relative to the tightening direction, a front and back flank, the front flank engaging the antiloosening detent being substantially parallel to the of the antiloosening dent axis and the rear flank engaging the antitightening detent being substantially parallel to the axis of the antitightening detent.

5. The chuck defined in claim 2 wherein the lockout element is a lockout ring axially offset from the adjustment ring.

6. The chuck defined in claim 5 wherein the lockout ring is formed with a pair of pockets in which the detents are engageable in the freeing positions of the lockout ring.

7. The chuck defined in claim 1, further comprising means for releasably securing the lockout element in the holdback position and the freeing position.

* * * * *